R. HOEHNE.
APPARATUS FOR FEEDING KILNS.
APPLICATION FILED MAY 3, 1909.

951,911.

Patented Mar. 15, 1910.
7 SHEETS—SHEET 1.

Fig. 1.

Witnesses:
C. E. Wessels
B. G. Richards

Inventor:
Richard Hoehne
By Joshua R. H. York
his Attorney.

R. HOEHNE.
APPARATUS FOR FEEDING KILNS.
APPLICATION FILED MAY 3, 1909.

951,911.

Patented Mar. 15, 1910.
7 SHEETS—SHEET 3.

Witnesses:
C. E. Wessels.
B. G. Richards.

Inventor:
Richard Hoehne.
By Joshua R. H. Potts
his Attorney.

UNITED STATES PATENT OFFICE.

RICHARD HOEHNE, OF CHICAGO, ILLINOIS.

APPARATUS FOR FEEDING KILNS.

951,911.  Specification of Letters Patent. Patented Mar. 15, 1910.

Application filed May 3, 1909. Serial No. 493,764.

*To all whom it may concern:*

Be it known that I, RICHARD HOEHNE, a subject of the Emperor of Germany, residing at Chicago, county of Cook, and State of Illinois, have invented certain new and useful Improvements in Apparatus for Feeding Kilns, of which the following is a specification.

My invention relates to apparatus for feeding kilns and its object is to provide a simple and effective feeding apparatus for continuously supplying a series of kilns with coal or other fuel. I attain this object by the mechanism illustrated in the accompanying drawing in which—

Fig. 5, an elevation of the mechanism shown in Fig. 4.
Fig. 7, a section on line V—V of Fig. 6, Fig. 8, a section on line W—W of Fig. 6, Fig. 9, a section on line X—X of Fig. 5, looking in the direction of arrows *a—a*.
Fig. 10, a section on line X—X of Fig. 5, looking in the direction of arrows *b—b*.
Fig. 11, a face view of a plate employed in the trap operating mechanism, Fig. 12, a partial section through the rocking lever employed in the trap operating mechanism, Fig. 13, an enlarged section through the kiln supplying chutes, Fig. 14, an enlarged section through the valve in the kiln supplying chutes;
Fig. 15, a section on line Y—Y of Fig. 14 and Fig. 16, an enlarged longitudinal section through the screw conveyer and trap mechanism employed for supplying coal to the kiln chutes.

Similar numerals refer to similar parts through out the several views.

Reference numeral 1 refers to a well or pit adapted to receive the coal or other fuel for the kilns and which may be continuously supplied with fuel in any convenient manner. From the pit 1 a bucket-chain elevator 2 leads to and discharges into a hopper 3, which in turn discharges into the screw conveyer tube 4. The tube 4 contains a screw conveyer 5 for feeding the fuel through the tube 4. At its other end tube 4 communicates with a cross tube 6 which in turn communicates with a tube 7 parallel with tube 4. Tube 7 communicates with a chute 8 which is adapted to discharge any fuel from tube 7. The elevator 2 is operated from an electric motor 9 or other suitable source of power. A belt 10 connects motor 9 with shaft 11, which in turn is connected with shaft 13 by means of beveled gears 12, and shaft 13 is connected by means of belt 14 with the driving shaft 15 of the elevator. Shaft 11 is also connected by means of belt 16 with the pulley 17 which operates the screw conveyer 5. Tubes 6 and 7 each contain screw conveyers similar to conveyer 5. The conveyer in tubes 6 is connected with conveyer 5 by means of beveled gears 18 and the conveyer in tube 7 is connected with the conveyer in tube 6 by means of beveled gears 19 so that upon rotation of conveyer 5 the others will also be rotated to continue the feed of the fuel through their respective tubes. By this arrangement it will be seen that the coal or other fuel will be continuously taken from the pit 1; elevated to conveyer tube 4 and continuously fed through tubes 4, 6 and 7. Tubes 4 and 7 are mounted respectively over rows of kilns 29 so that by this arrangement a continuous supply of fuel is caused to pass constantly over the kilns.

Figure 1:
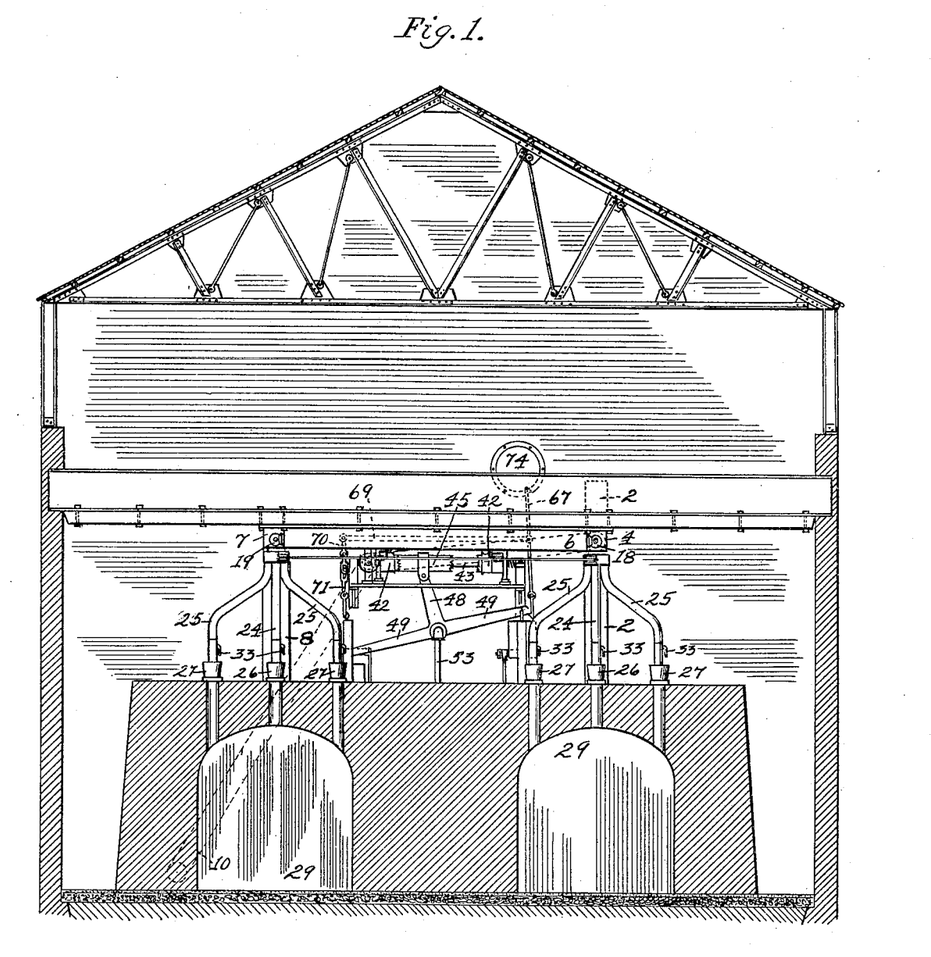
Figure 1 is a section through two kilns showing the feeding apparatus in elevation.
Figure 2:
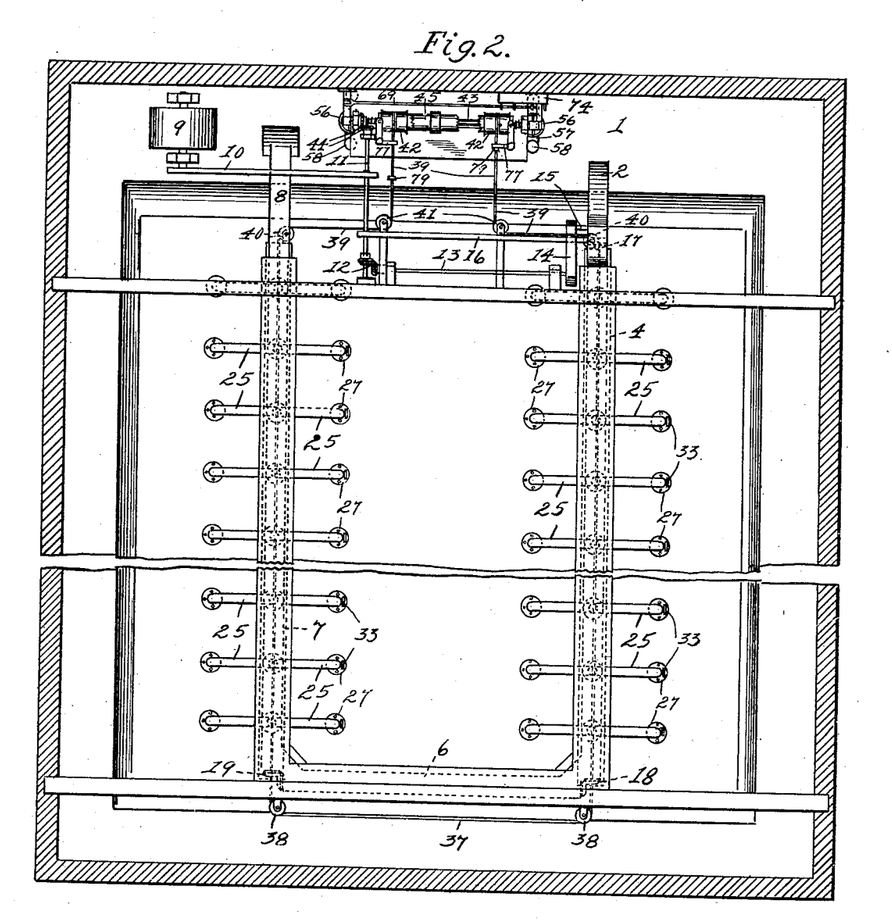
Fig. 2, a partial top plan view of the feeding apparatus and kilns.
Figure 3:
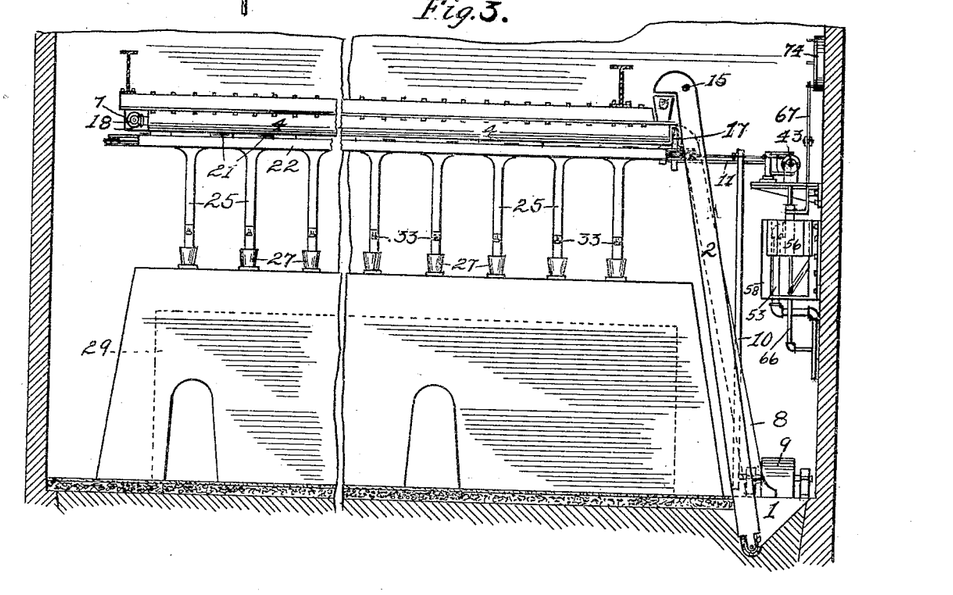
Fig. 3, a partial side elevation of the kilns and feeding apparatus.
Figure 4:
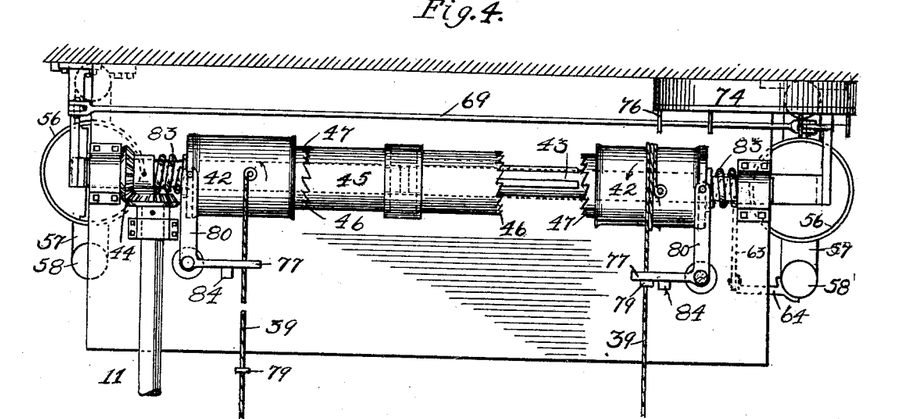
Fig. 4, an enlarged plan view of mechanism employed for operating trap mechanism which supplies the coal to the different kilns.
Figures 5, 7, 8:
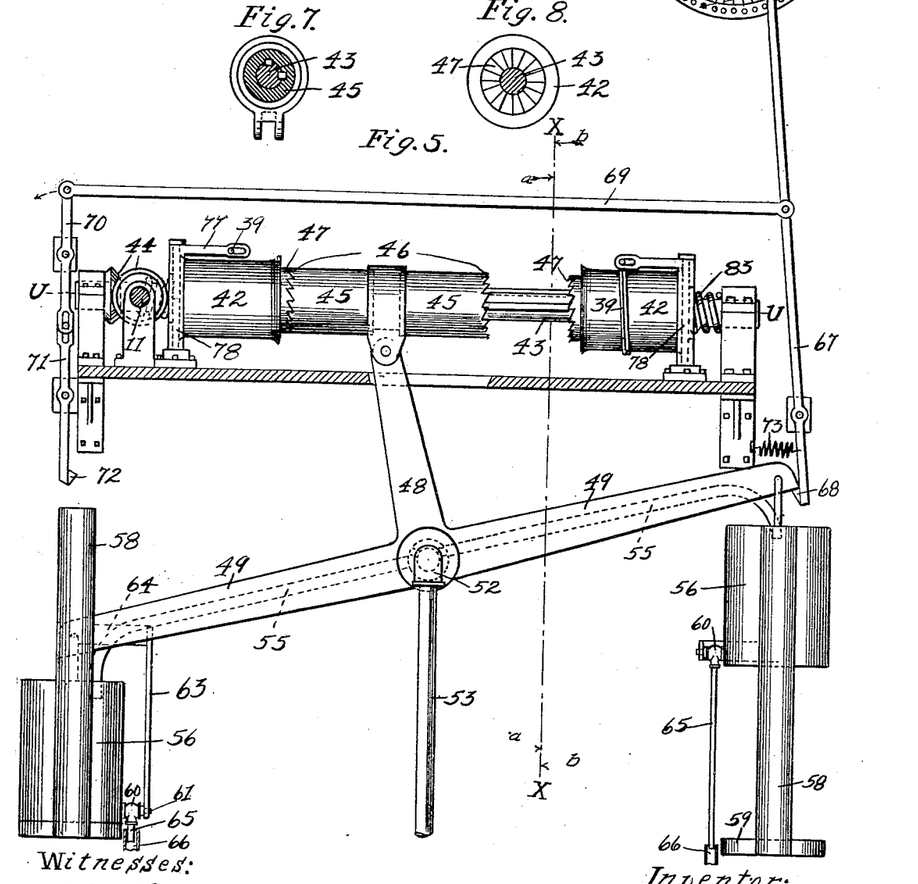

At intervals, in the bottoms of tubes 4 and 7, openings or passages 20, adapted to be closed by slidable gates 21, are provided. These openings or passages 20 lead to a trap compartment 22 which is provided in its bottom with openings 23 communicating with kiln-supplying chutes 24 and 25. These chutes 24 and 25 lead to hoods 26 and 27 set over and in open communication with the passages 28 which lead to the corresponding kiln 29, there being one set of chutes 24 and 25 for each kiln to be supplied with fuel. Each of the chutes 24 and 25 are provided with a cone shaped valve 30 suspended by a link rod 31 from the lever 32 which is provided with a weight 33 adapted to counter balance the weight of valve 30 and a certain amount of fuel supported thereby. In the top of hoods 26 and 27 are provided peep holes 34 which may be closed by glass or other transparent material. In trap compartment 22 is mounted a slidable rod 35 carrying partitions 36 and which thus divide the trap compartment 22 into a series of separate and individual traps, there being a rod 35 and corresponding partitions 36 in the trap compartment under each of the tubes 4 and 7. At one end the rods 35 are connected by a cable 37 passing over pulleys 38 and at their other ends are connected with cables 39 passing over pulleys 40 and 41 and winding upon drums 42 loosely mounted on shaft 43. The shaft 43 is continuously rotated from shaft 11 by means of beveled gears 44, and carries a clutch 45 splined thereto. Both ends of clutch 45 are provided with clutch teeth 46 adapted to engage with similar clutch teeth 47 on the opposing faces of drums 42. The clutch 45 is operated by a lever arm 48 having a swiveled connection therewith. Lever arm 48 is carried by a rocking beam 49 pivotally supported on the hollow stud 50 on support 51. The hollow stud 50 is connected by means of an elbow 52 with a water pipe 53 which thus continuously supplies the interior of stud 50 with water. Ports 54 are provided in stud 50 and are adapted to communicate with pipes 55 carried by rocking beam 49. The ports 54 are so spaced that when one side of the rocking beam is elevated the corresponding pipe 55 is in register with the corresponding port 54 so that water is supplied to that pipe, the supply of water being in the mean time cut off from the other pipe. Suspended from either end of rocking beam 49 are pails or buckets 56 provided with lugs 57 slidably engaging guides 58 which are supported by a bracket 59. Each of the pails 56 is provided with a stop cock 60 the stem of which carries a rectangular head 61 taking in a slot 62 in a lever 63 pivoted on the lug 64 on bracket 59. A discharge pipe 65 leads from stop cock 60 and telescopes into a drain pipe 66. At one side of the rock beam 49 is mounted a lever 67 having a catch 68 adapted to engage under the end of rock beam 49 and hold it in elevated position as indicated in Fig. 5. Lever 67 is connected by a link 69 with a lever 70 having a slot and pin connection with a lever 71 carrying catch 72 adapted to engage with the other end of rock beam 49 to hold it in elevated position. A spring 73 is attached to lever 67 and serves to hold levers 67 and 71 in position to automatically engage the corresponding ends of rock beam 49 when elevated. Levers 67 and 71 are operated by means of suitable clock mechanism carrying a rotatable dial 74 provided with pin holes 75 adapted to receive pins 76. The dial 74 is so placed that as it rotates the pin 76 will engage the upper end of lever 67 to cause the catches 68 or 72 to release the end of the rock beam 49 which may be in engagement with them.

By using more or less of the pins 76 it will be seen that the number of operations of levers 67 and 71 per revolution of the dial 74 may be regulated as desired. By this arrangement it will be seen that when the rock beam 49 is in one of its elevated positions clutch 45 is shifted to cause operation of one of the drums 42 to wind up the corresponding cable 39, the other drum being free to unwind to permit this. This action will cause a corresponding sliding movement of the rods 35 and partitions 36 in trap compartment 22. The parts are so designed and regulated that when the desired movement of the partitions 36 has been effected, a pin 76 on clock dial 74 causes the release of the elevated end of rock beam 49 as explained above. In the meantime the pipe 55 in the elevated end of rock beam 49 has been discharging water into the corresponding pail 56, so that when the rock beam is released the weight of water in the pail 56 will cause the beam to rock on its pivot cutting off the supply of water to the full pail, opening the supply of water to the other pail, stopping the winding operation of the one drum and starting the unwinding operation of the other drum. As the full pail descends the lug 61 operating in lever 63 will cause the stop cock 60 to open and permit the water in said pail to run into drain pipe 66, thus emptying that pail. Simultaneously the other lever 63 has caused lug 61 to close the corresponding stop cock 60, rock beam 49 has been caught in its elevated position and the corresponding pail is being filled with water. At the proper time another pin 76 causes release of the rock beam 49 and descent of the full pail and elevation of the empty pail thus shifting the clutch 45, reversing the action of drum 42 and thus causing the return of rod 35 and partitions 36 to their original positions. By this arrangement will be seen that the time of reciprocations of partitions 36 may be regulated as desired.

As stated above the partitions 36 form traps in trap compartments 22 adapted to receive charges of fuel from the screw conveyers through openings 20 so that upon each movement of the partitions 36 a charge of fuel will be carried to one of the adjacent sets of kiln-supplying chutes. This fuel passing down through said chutes will accumulate upon the valves 30 until the weight of the fuel and the valve overcome the weight 33 when the fuel will be discharged into the kiln. By closing the gates 21 in every alternate opening 20 each of the sets of kiln-supplying chutes will receive a charge of coal upon every alternate movement of the partitions 36. In this manner it will be seen the kilns may be continuously supplied with fuel and that the quantity and time of such supply may be regulated as desired.

Figure 6:
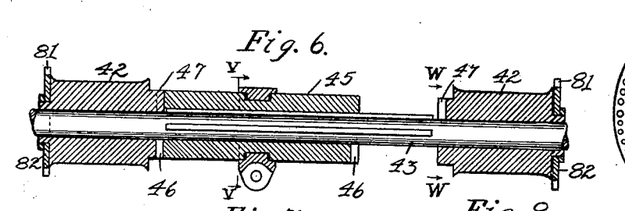
Fig. 6, a partial section on line U—U of Fig. 5.
Figures 9, 10, 11, 12:
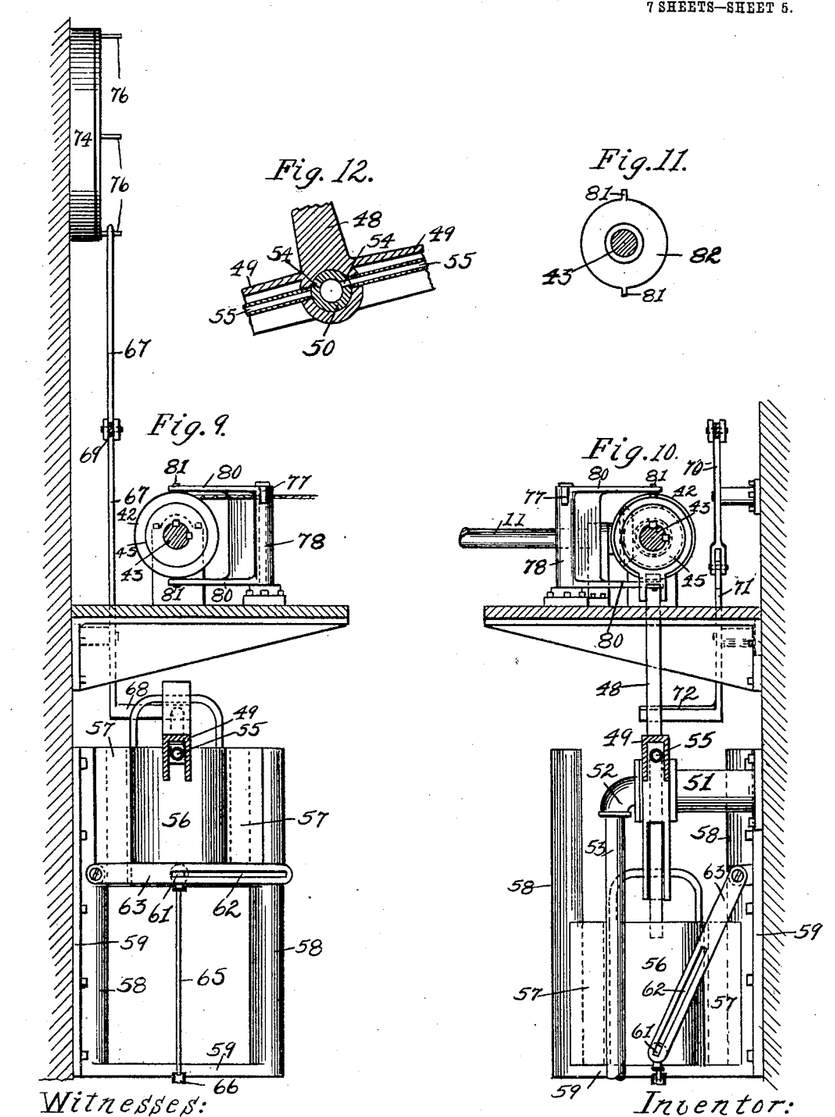
Figures 13, 14, 15:
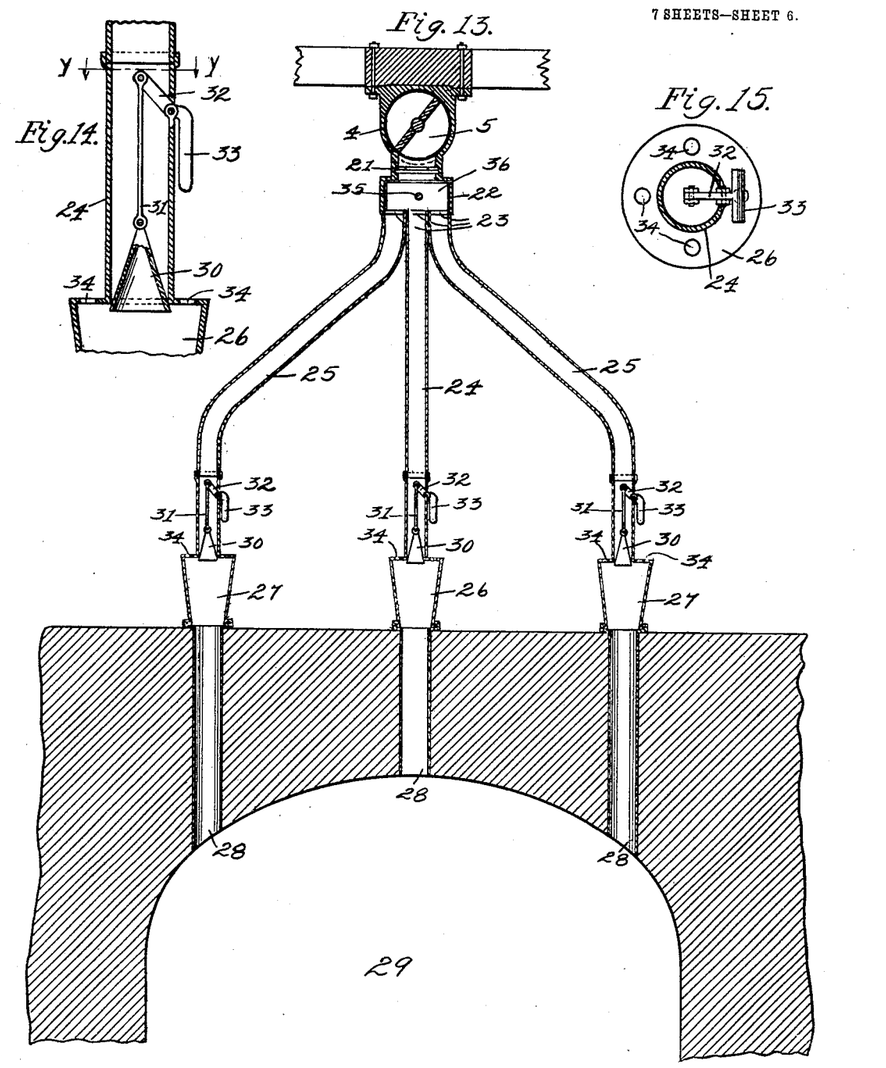
Figure 16:
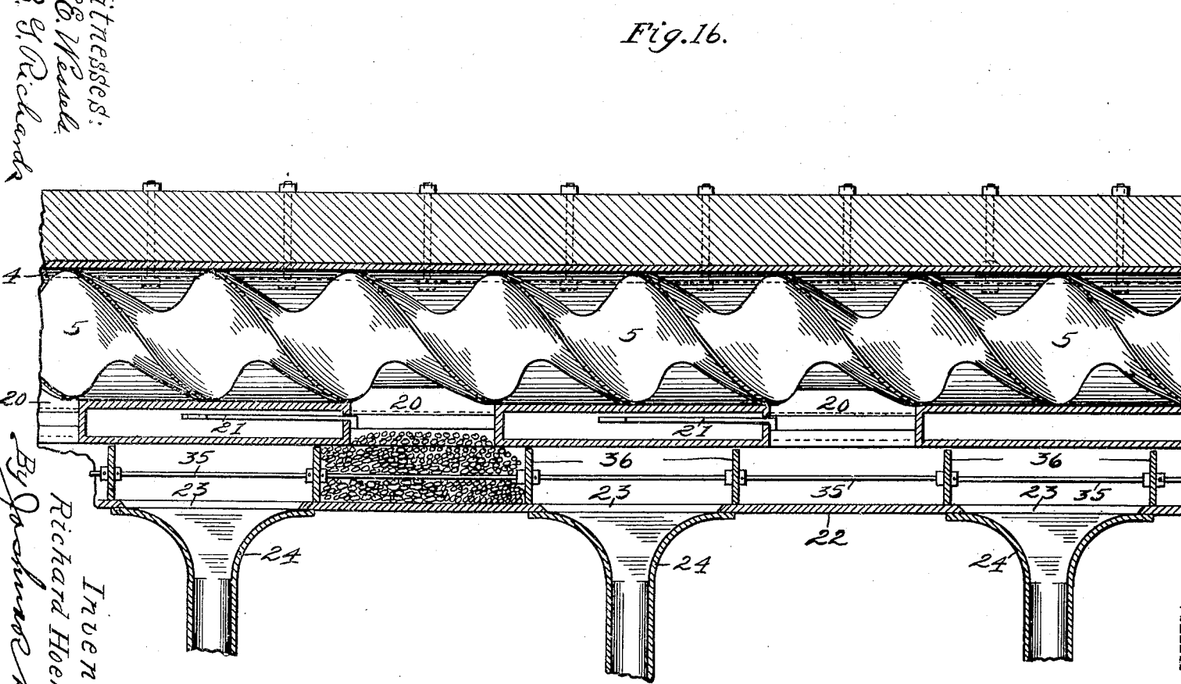

Each of the cables 39 passes through a slot in an arm 77 on the pivoted post 78 and carries a stop 79 adapted to engage said arms 77, when the cable has been sufficiently wound onto its drum to cause the required movement of partitions 36. Each of the posts 78 carries two arms 80 having slotted connections with the pins 81 on the plates 82 which are swiveled to drums 42 as shown in Fig. 6. Springs 83 are imprisoned behind drums 42 and serve to hold the drums up to clutching position with clutch 45, stops 84, secured to the framework limiting this movement of arms 77 and the drums. By this arrangement it will be seen that should the adjustments be not quite correct or should the rock beam 49 for any reason fail to operate at the proper time to reverse the movement of rods 35 and partitions 36, the stops 79 will engage the arms 77 and automatically throw the active drum 42 out of engagement with the clutch 45 and thus discontinue the movement of the rods and partitions.

While I have illustrated and described the preferred construction for carrying my invention into effect this is capable of modification and variation without departing from the spirit of the invention. I therefore do not wish to be limited to the exact construction set forth but wish to avail myself of such modifications and changes as come within the scope of the appended claims.

Having described my invention what I claim as new and desire to secure by Letters Patent is:

1. The combination with a series of kilns, of conveying apparatus for conducting fuel over the kilns; and time controlled mechanism for periodically delivering a charge of fuel from the conveying apparatus to the kilns, substantially as described.

2. The combination with a series of kilns, of conveying apparatus for conducting fuel over the kilns; chutes leading from the conveying apparatus to the kilns, trap mechanism for delivering fuel from the conveying apparatus to the kiln chutes; and mechanism for periodically operating the trap mechanism, substantially as described.

3. The combination with a series of kilns, of conveying apparatus for conducting fuel over the kilns, chutes leading from the conveying apparatus to the kilns; trap mechanism for delivering fuel from the conveying apparatus to the kiln chutes; and clock controlled mechanism for periodically operating the trap mechanism, substantially as described.

4. The combination with a series of kilns, of conveying apparatus for conducting fuel over the kilns; chutes leading from the conveying apparatus to the kilns; trap mechanism for delivering fuel from the conveying apparatus to the kiln chutes; mechanism for periodically operating the trap mechanism; and weight controlled valves in the kiln chutes, substantially as described.

5. The combination with a series of kilns, of conveying apparatus for conducting fuel over the kilns, chutes leading from the conveying apparatus to the kilns; trap mechanism for delivering fuel from the conveying apparatus to the kiln chutes; clock controlled mechanism for periodically operating the trap mechanism; and weight controlled valves in the kiln chutes, substantially as described.

6. The combination with a series of kilns, of a screw conveyer for conducting fuel over the kilns; a trap compartment located under the conveyer and provided with openings communicating therewith; a series of slidable partitions in said trap compartment, dividing it into separate traps; mechanism for periodically reciprocating said partitions; and kiln supplying chutes adapted to receive the charge from said traps upon reciprocations thereof, substantially as described.

7. The combination with a series of kilns, of a screw conveyer for conducting fuel over the kilns; a trap compartment located under the conveyer and provided with openings communicating therewith; gates for opening or closing said opening; a series of slidable partitions in said trap compartment, dividing it into separate traps; mechanism for periodically reciprocating said partitions; and kiln-supplying chutes adapted to receive the charge from said traps upon reciprocations thereof, substantially as described.

8. The combination with a series of kilns, of a screw conveyer for conducting fuel over the kilns, a trap compartment located under the conveyer and provided with openings communicating therewith; a series of slidable partitions in said trap compartment, dividing it into separate traps, clock controlled mechanism for periodically reciprocating said partitions, and kiln-supplying chutes adapted to receive charge from said traps upon reciprocations thereof, substantially as described.

9. The combination with a series of kilns, of a screw conveyer for conducting fuel over the kilns, a trap compartment located under the conveyer and provided with openings communicating therewith; a series of slidable partitions in said trap compartment, dividing it into separate traps; mechanism for periodically reciprocating said partititons; kilns supplying chutes adapted to receive the charge from said traps upon reciprocation thereof; and weight controlled valves in the kiln-chutes, substantially as described.

10. The combination with a series of kilns, of a screw conveyer for conducting fuel over the kilns; a trap compartment located under the conveyer and provided with openings communicating therewith; gates for opening or closing said openings; a series of slidable partitions in said trap compartment dividing it into separate traps; clock controlled mechanism for periodically reciprocating said partitions; kilns supplying chutes adapted to receive the charge from said traps upon reciprocation thereof; and weight controlled valves in the kiln chutes, substantially as described.

11. The combination with a series of kilns, of conveying apparatus for conducting fuel over the kilns; chutes leading from the conveying apparatus to the kilns; means for delivering fuel from the conveyer to the chutes; and weight controlled valves in the chutes, substantially as described.

12. The combination with a series of kilns, arranged in two parallel rows, of a screw conveyer passing over one row in one direction; a screw conveyer passing over the other row in a direction opposite to that over the first row, a screw conveyer connecting the first mentioned conveyers at one end; an elevator adapted to receive fuel and deliver it to the screw conveyers; trap compartments under the conveyers over the kilns and provided with openings communicating therewith; a series of partitions, in the trap compartments, mounted on slidable rods; clock controlled mechanism for periodically reciprocating said rods; and kiln-supplying chutes communicating with the bottom of the trap compartments between the conveyer openings, substantially as described.

13. The combination with a series of kilns, arranged in two parallel rows, of a screw conveyer passing over one row in one direction; a screw conveyer passing over the other row in a direction opposite to that over the first row; a screw conveyer connecting the two first mentioned conveyers at one end; an elevator adapted to receive fuel and deliver it to the screw conveyers; trap compartments under the conveyers over the kilns and provided with openings communicating therewith; a series of partitions, in the trap compartments, mounted on slidable rods; clock controlled mechanism for periodically reciprocating said rods; kiln-supplying chutes communicating with the bottom of the trap compartments between the conveyer openings and weight controlled valves in the kiln chutes, substantially as described.

In testimony whereof I have signed my name to this specification in the presence of two subscribing witnesses.

RICHARD HOEHNE.

Witnesses:
JOSHUA R. H. POTTS,
ARTHUR A. OLSON.